UNITED STATES PATENT OFFICE.

JOHN Q. DUNLAP, OF SEYMOUR, TEXAS.

SHEEP-WASH.

SPECIFICATION forming part of Letters Patent No. 273,972, dated March 13, 1883.

Application filed December 7, 1882. (No specimens.)

*To all whom it may concern:*

Be it known that I, J. Q. DUNLAP, of Seymour, in the county of Baylor and State of Texas, have invented certain new and useful Improvements in Sheep-Washes; and I do hereby declare that the following is a full, clear, and exact description of the invention, which will enable others skilled in the art to which it appertains to make and use the same.

This invention has reference to a new and useful sheep dip or wash for the prevention and cure of "scabs;" and it consists of the following ingredients, combined in about the proportions stated, viz.: *Phytolacca decandra,* (poke-weed,) four ounces; sal-soda, two ounces; water, one gallon. Of the first-named ingredient, which is the ordinary poke-weed, I use by preference the dried herb. The given quantity of this (four ounces) is steeped for about two hours in a gallon of hot water, or until all the strength has been extracted. The infusion thus prepared is then mixed with sal-soda (two ounces) until the last-named ingredient has been thoroughly dissolved. The compound is then ready for use.

In using the wash or compound I find it advantageous first to heat the same to 110° Fahrenheit. It is then to be used or applied, in the usual manner, by thoroughly washing or partially immersing the sheep.

For the infusion of the dried herb, as above set forth, a diluted extract may be substituted, as follows: The extract is made by expressing the juice from the green herb and reducing the same by evaporation to one-half its bulk. Take of this extract one gallon, of sal-soda ten pounds, and of water eighty gallons. These ingredients are to be thoroughly mixed and used or applied in the manner above stated, being first heated to 110° Fahrenheit.

I am aware that the *Phytolacca* has been used as a lotion for cutaneous eruptions and as a parasiticide; but I am not aware that heretofore any alkali has been combined therewith.

I claim as my invention—

The herein-described sheep-wash, consisting of an infusion or diluted extract of *Phytolacca decandra* (poke-weed) and sal-soda, in about the proportions set forth.

In testimony that I claim the foregoing as my own I have hereunto affixed my signature in presence of two witnesses.

JOHN Q. DUNLAP.

Witnesses:
W. M. BEVERS,
CHAS. HUMPHRIES.